United States Patent [19]

Benjamin

[11] Patent Number: 4,889,418
[45] Date of Patent: Dec. 26, 1989

[54] ROTATING CYLINDRICAL BEAM SPLITTER

[75] Inventor: Roland J. Benjamin, Park Ridge, Ill.

[73] Assignee: Hughes Aircraft Company, Los Angeles, Calif.

[21] Appl. No.: 846,377

[22] Filed: Mar. 31, 1986

[51] Int. Cl.$^4$ ............... G02B 5/136; G02B 26/10
[52] U.S. Cl. ................................. 350/486; 350/6.8; 350/172
[58] Field of Search ............... 350/486, 172, 6.8

[56] References Cited

U.S. PATENT DOCUMENTS 4,118,619 10/1978 McArthur et al. ............ 350/172
4,518,218 5/1985 Diepeveen .................... 350/6.8

Primary Examiner—Bruce Y. Arnold
Assistant Examiner—Rebecca D. Gass
Attorney, Agent, or Firm—William J. Streeter; A. W. Karambelas

[57] ABSTRACT

A rotating cylindrical or prismatic reflective body (28, ... 428) is used as a beam splitter in a laser system in which an outgoing pulsed high-energy beam (12) and a low-energy return beam (30) from a target follow coincident optical paths. During one portion of rotation of its rotation cycle, the reflective surface (42, ... 442) is removed from the optical path to permit passage of the high-energy laser pulse past a bypass surface (44, ... 444). During a second portion of its rotation cycle, the body reflects the target return beam to a sensor (34).

11 Claims, 3 Drawing Sheets

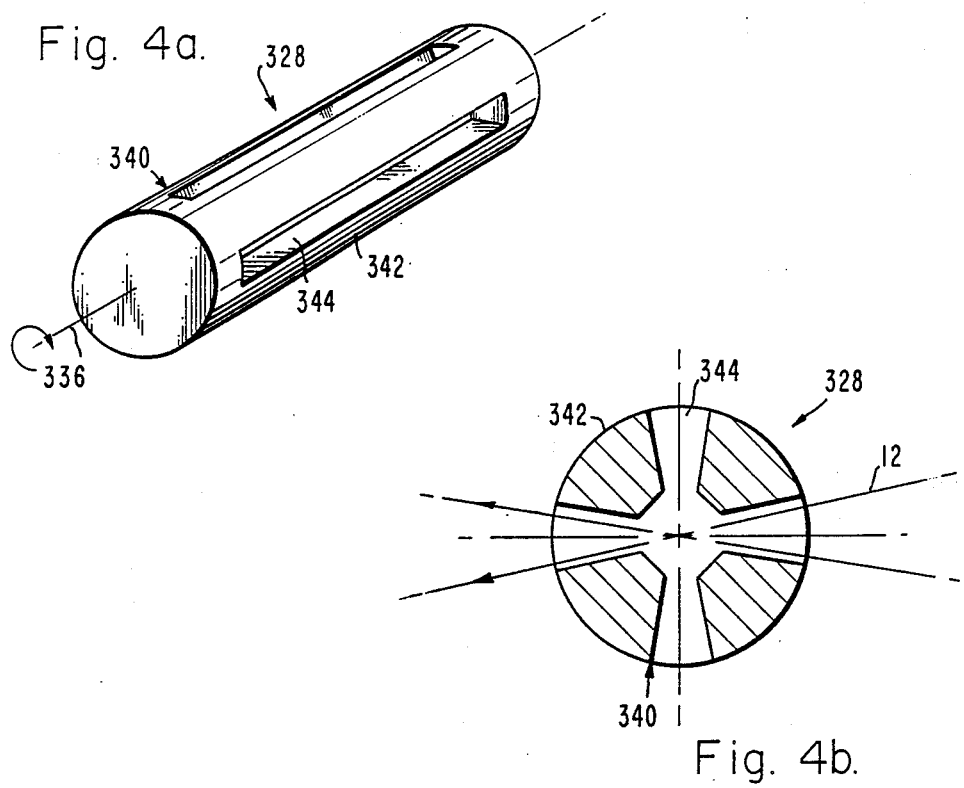
Fig. 4a.
Fig. 4b.
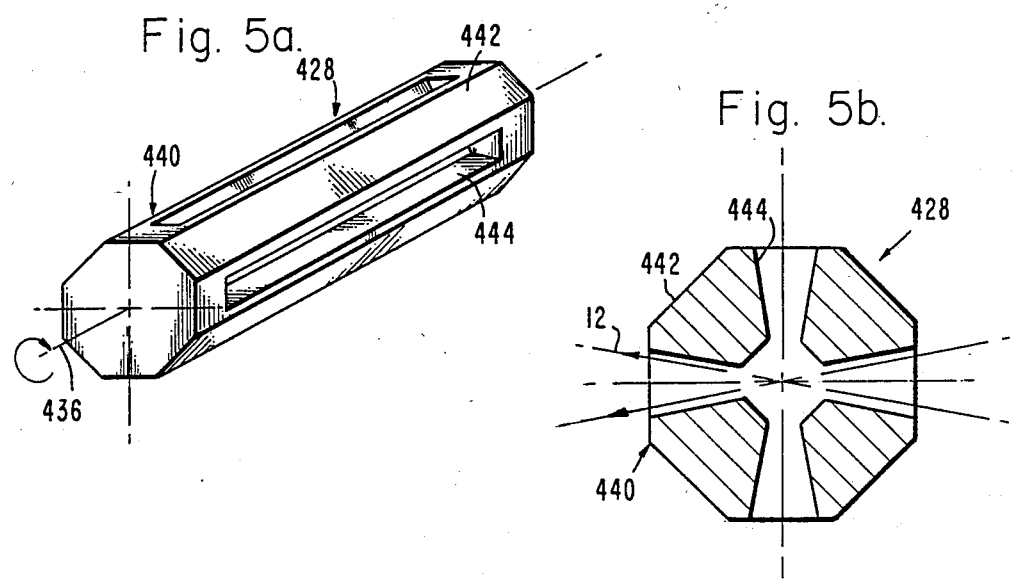
Fig. 5a.
Fig. 5b.

ROTATING CYLINDRICAL BEAM SPLITTER

BACKGROUND OF THE INVENTION

This invention was made with Government support under Contract No. F29601-85-C-0071 awarded by the Department of the Air Force. The Government has certain rights in this invention.

The present invention relates to a rotatable beam splitter for redirecting a beam of electromagnetic energy from one path to another and, in particular, for cyclicly redirecting the beam.

A preferred use of the present invention is in a laser system in which an outgoing pulsed, high-energy beam to a target and a low-energy return beam from the target follow coincident optical paths adjacent the beam splitter. During one portion of the beam splitter's rotational cycle, a reflective surface on the beam splitter is removed from the optical path so that the high-energy laser pulse bypasses the surface. During a second portion of its rotational cycle, the beam splitter surface is positioned to reflect the target return beam to a sensor.

Notwithstanding its preferred use, the present invention is applicable wherever the path of electromagnetic radiation must be diverted or alternated. However, because of its preferred use, the following recitation will be directed toward high-energy laser systems.

In prior work leading up to the present invention, a reflective rotating disk containing one or more slots was considered for use as an optical element to divert a target return beam from an outgoing beam path. The outgoing and return beams comprised high-energy laser and low-energy reflected and/or re-radiated beams respectively directed to and from a target. The source of the laser radiation was a pulsed laser. The slot in the reflective disk was located at the focal plane of the cylindrical optics. The outgoing high-energy laser beam was reflected off the cylindrical mirror and focused down to a line. When the rotating disk was in the correct orientation, the pulsed laser beam was able to pass therethrough, and recollimated by another cylindrical mirror for direction to a target. At the same time, continuous wave energy from the target entered the pointing and tracking system and was focused down to a line focus by a recollimating cylindrical mirror. When the disk was in other than a pulse-firing orientation, the target energy was reflected off the disk surface to another cylindrical mirror. The target energy was then recollimated and forwarded to a target sensor.

While the prior system was effective for its intended use, it was subject to several disadvantages. The thinness of the disk with respect to its radius created centrifugal forces and stresses which either affected its optical properties or reduced its usable life. Its size also affected the speed at which it could be rotated and, therefore, limited the rate at which the laser could be repeatedly pulsed. In order to protect the disk against such stresses and strains, high cost materials, such as beryllium, were required. The bearings supporting the disk were also subject to wear.

In contrast to other systems where diffractive surfaces are used, the system was not wavelength- or polarization-sensitive.

SUMMARY OF THE INVENTION

The present invention overcomes and avoids these and other problems by configuring the beam splitter as a cylinder having a discontinuous reflective surface positioned about its axis of rotation. The cylinder is so placed generally in the path of the electromagnetic energy that the beam may be reflected from the reflective surface when desired and may bypass the surface when reflection is not desired.

In the preferred embodiment and use of the present invention with pulsed high-energy beams, the beam splitter is configured as a rotating cylinder or prism having one or more reflective surfaces. An outgoing pulsed high-energy beam directed to a target returns on a coincident optical path as a low-energy beam. During one or more portions within a single rotation of the beam splitter, the reflective surface or surfaces are removed from the optical path to permit the high-energy laser pulse to bypass the surface(s). During another portion or portions within the single rotation, the reflective surface(s) reflect the return low-energy beam to a sensor.

Several advantages and objectives accrue from this arrangement. As distinguished from systems utilizing diffractive surfaces, the present invention is not wavelength- or polarization-sensitive because it uses reflective surfaces. Because the high-energy laser beam does not touch the reflective surface(s), pulse damage potential is minimized and, further, cooling of the beam splitter is not required. The rotating element and its discontinuous reflective surface can be sized to that of the beam and, therefore, fabrication of the element is simplified by use of smaller structures. Therefore, centrifugal stresses are greatly reduced, permitting the use of less costly materials and an increase in rotational speeds. Thus, greater laser pulse repetition rates are obtainable than with prior devices. Also, because of its reduced size, the beam splitter's weight is accordingly reduced to minimize support bearing structural complexities and wear.

Other aims and advantages, as well as a complete understanding of the present invention will appear from the following explanation of exemplary embodiments and the accompanying drawings thereof.

BRIEF DESCRIPTION OF THE DRAWINGS

FIGS. 4a-4b and 5a-5b illustrate further embodiments in which the discontinuous reflective surface is illustrated as bypassing slots extending through the cylinder or prism to divide the reflecting surfaces into segments.

DESCRIPTION OF THE PREFERRED EMBODIMENTS

Figure 1:
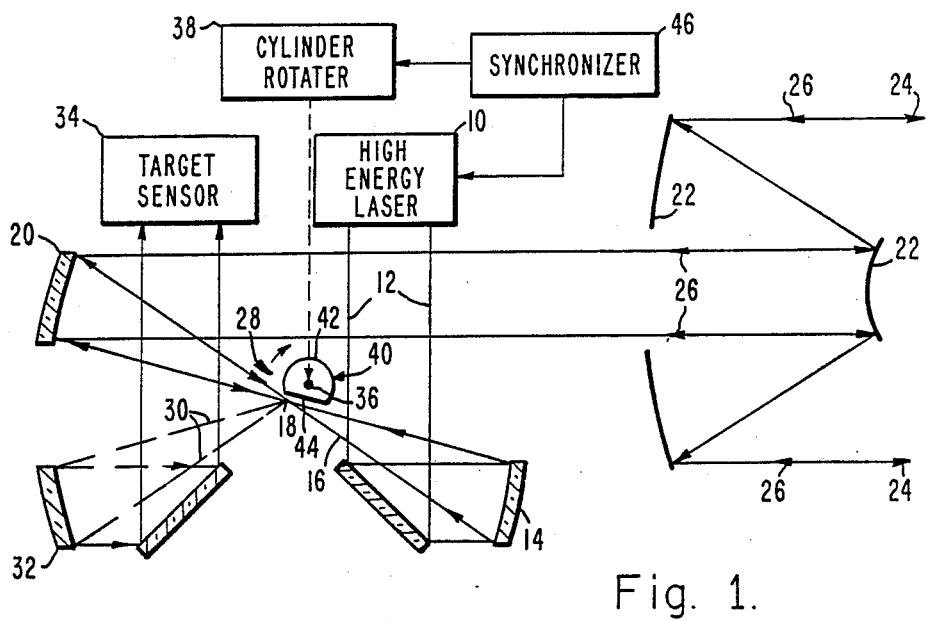
FIG. 1 is an illustrative system layout, showing a preferred use of the present invention embodied as a rotating cylinder provided with a discontinuous reflecting surface comprising a single curved surface and a single flat.

In order to understand the invention in the environment of its preferred use, reference to FIG. 1 is made.

While this particular optical system as illustrated is not intended to be limiting as to the scope of protection desired, it is useful in understanding the reasons for the particular beam splitter concept.

Accordingly, a high-energy laser 10 is disposed to produce a pulsed laser beam as represented by parallel lines 12. Beam 12 is directed, as represented by arrowheads in lines 12, to a cylindrical optical structure 14 which redirects the beam along a path 16 having a line focus at 18, for reflection from further cylindrical optical elements 20 to a beam expander 22. From the beam expander, the laser beam then propagates to a target, in the direction represented by arrows 24. Reflected and/or re-radiated energy from the target is returned as a low-energy beam to the beam expander in the direction represented by arrows 26. The return beam is reflected from cylindrical optics 20 and redirected by reflection from a beam splitter 28 as return beam 30 for reflection from further cylindrical optics 32 and transmission to a target sensor 34.

Typically, laser beam 12 is of high energy, while return beam 26 is of low energy. Because it is desired that the return low energy beam not be redirected to the high-energy laser source 10, but to target sensor 34, it is necessary to redirect the returning beam away from outgoing high-energy beam path 16. This redirection is effected by rotating cylindrical beam splitter 28.

Beam splitter 28 is disposed to rotate about an axis 36 by a rotator 38. The beam splitter may be supported by any convenient means, such as by an air bearing of conventional construction.

The beam splitter includes a discontinuous or asymmetrical reflective surface 40 which, as shown, comprises a first reflective surface 42 and a bypass surface 44. Accordingly, the reflective operation of surface 40 is made discontinuous.

In order that high-energy beam 16 bypass beam splitter 28 past surface 44 while permitting return beam 30 to be reflected from surface 42, it is necessary to synchronize the pulsing of laser 10 with the rotation of beam splitter 28. Accordingly, a synchronizer 46 is coupled to high-energy laser source 10 and cylinder rotator 38 so that reflective surface 42 and flat bypass surface 44 are positioned properly for passage of high-energy beam 16 and reflection of low-energy return beam 30. The synchronization means is well known in the art and comprises, for example, an optical encoder coupled to beam splitter 28 to monitor its rotational position and trigger the pulsing of laser 10.

Beam 16 of high energy from high-energy laser 10 is brought to a line focus at 18 in the vicinity of rotating cylindrical beam splitter 28 by cylindrical optics 14. After passing through the line focus, beam 16 is recollimated by cylindrical optics 20. It is then expanded to a larger collimated beam by beam expander 22 and proceeds outward to a target (not shown). The return energy from the target, as represented by arrow heads 26, is collected by the beam expander, onto cylindrical optics 20, and brought to a line focus, which is coincident with line focus 18 of the original high-energy laser beam.

If unobstructed, this return energy would proceed onto cylindrical optics 14 and be recollimated and returned in the direction of high-energy laser 10, and thus become lost. However, because of the presence of rotating cylindrical beam splitter 28, the return optical path is obstructed by surface 42 of the beam splitter. When this occurs, the return target beam is reflected from surface 42 to cylindrical optics 32, where it is recollimated and transferred to target sensor 34 for processing. As stated before, rotation of beam splitter 28 and the pulsed firing of high-energy laser 10 are synchronized so that the laser will fire when the beam splitter is in the position to permit passage of the high-energy laser beam past surface 44.

The rotating beam splitter may take various forms depending upon the characteristics of the high-energy laser beam and of the target sensor, as depicted in FIGS. 2-6.

Figure 2A:
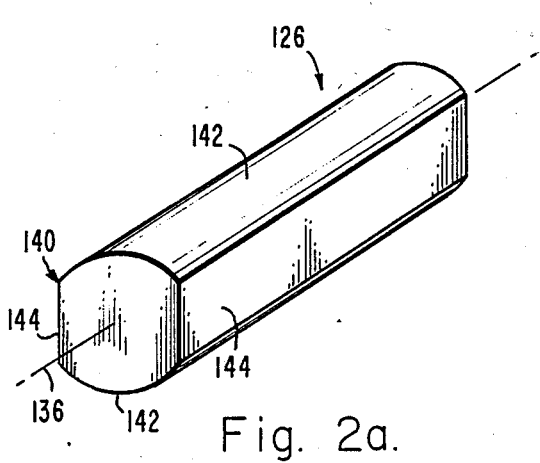
FIGS. 2a-2c depict a modification of the beam splitter having a pair of parallel flat surfaces interrupting diametrically opposed curved reflecting surfaces with FIGS. 2b and 2c illustrating respective bypassing of and reflection from the beam splitter's discontinuous surface.
Figure 2B:
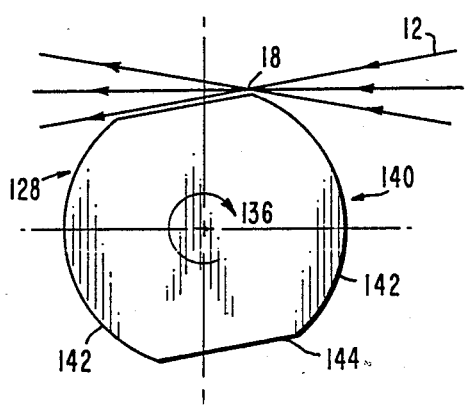
Figure 2C:
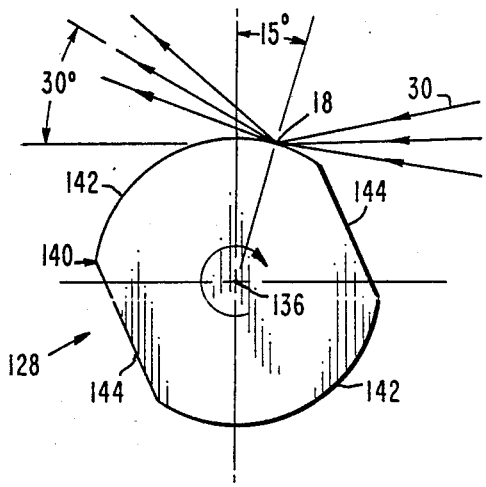

FIGS. 2a-2c show one form for a rotating beam splitter 128 having a discontinuous reflective surface 140 which is apportioned into circular cylindrical portions 142 and two flat portions 144. The flat portions permit passage of high-energy laser pulse 16 past beam splitter 128. A particular implementation is shown in FIGS. 2b-2c. When the beam splitter is in the rotational orientation shown in FIG. 2b, laser pulse 16 is transmitted past flat bypass portion 144. Further rotation leads to reflection of return beam 30 from portion 142 to sensor 34, as shown in FIG. 2c. This cycle is repeated twice per rotation of beam splitter 128 for the configuration shown, permitting a greater laser pulse rate for a particular rotational speed of the beam splitter.

Figure 3A:
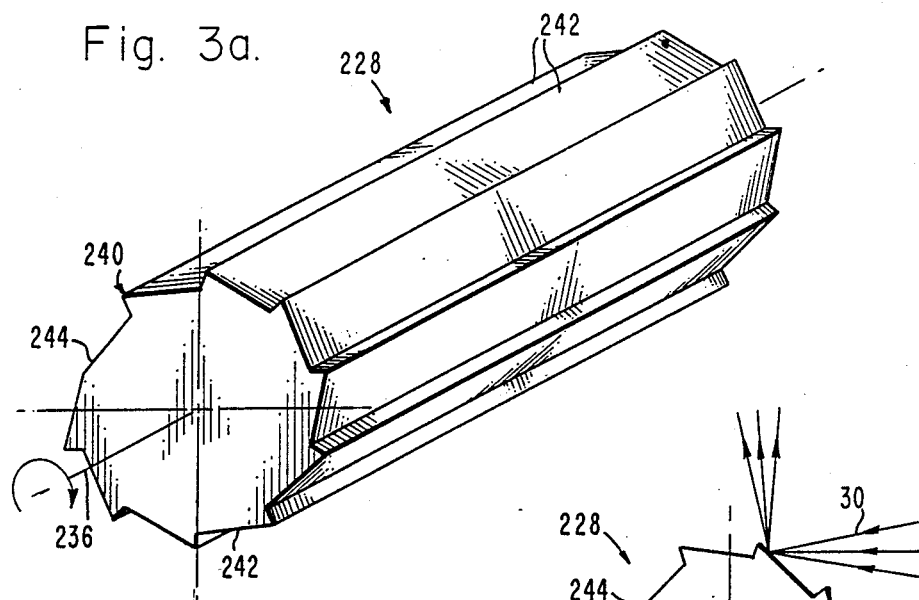
FIGS. 3a-3b show a further embodiment featuring a faceted rotating beam splitter whose discontinuous reflecting surface includes a series of flat mirror facets on the rotating body.
Figure 3B:
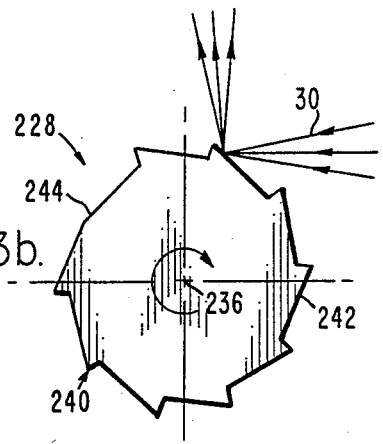

FIGS. 3a-3b illustrate an alternate version featuring a faceted rot beam splitter 228, including a discontinuous or asymmetrical reflecting surface 240 comprising a reflective portion 242 and a bypass portion 244. The reflective surface portion takes the form of a series of flat mirror facets 242 on the rotating body. The rotation of the beam splitter about its axis 236 causes return beam 30 to be swept across sensor 34 once for each facet involved. Since one facet is missing at bypass portion 244, clearance is provided for transmission of the outgoing high-energy laser pulse.

FIGS. 4a-4b and FIGS. 5a-5b show further embodiments of the beam splitter. For these cases, rotating beam splitters 328 and 428 respectively have discontinuous surfaces 340 and 440 formed by reflective surface portions 342 and 442 made discontinuous by bypass portions 344 and 444. Beam splitter rotation and high-energy laser pulse are synchronized so that beam 16 passes through a slot 344 or 444, while the target return beam is reflected from cylindrical surface 342 of FIGS. 4a-4b or flat facets 442 in FIGS. 5a-5b.

For any of the rotating beam splitters, as stated above, the preferred method of support is the use of air bearings at each end of the beam splitter. These air bearings, which are commercially available, provide extremely precise rotational accuracy. All beam splitters are producible by precision diamond machining, the cylindrical embodiment by machining the cylinder mounted between centers, using a diamond-turning machine. The faceted beam splitter is producible by mounting the beam splitter between centers and machining the individual facets by use of a diamond fly-cutting machine.

Although the invention has been described with reference to particular embodiments thereof, it should be realized that various changes and modifications may be made therein without departing from the spirit and scope of the invention.

What is claimed is:

1. A beam splitter for periodically redirecting a beam of electromagnetic energy from its path comprising:
   a cylinder having an axis of rotation and a discontinuous reflective surface which is positioned about the axis and which comprises at least one reflective portion positionable in the path and at least another portion positionable outside of the path; and means for rotating said cylinder about its axis for positioning said reflective surfaces respectively in and outside of the beam path, and thereby for enabling respective reflection of the beam from said one surface portion and for bypassing of the beam past said other surface portion.

2. A beam splitter according to claim 1 in which said reflective portion comprises at least one cylindrical surface centered about the axis.

3. A beam splitter according to claim 1 in which the reflective portion comprises at least one flat reflective facet.

4. A beam splitter according to claim 3 in which said reflective portion comprises a series of flat mirror facets.

5. A beam splitter according to claim 1 in which said other portion comprises at least one slot passing through said cylinder and extending through said reflective portion, for enabling the beam to bypass said reflective portion.

6. A beam splitter according to claim 1 further comprising a source of the beam for intermittent transmission thereof, and means for synchronizing the intermittent transmission with said cylinder moving means.

7. A beam splitter according to claim 6 further comprising optical elements for directing the beam from its source along its path and to a target for reflection and/or re-radiation therefrom and for directing the return energy back along at least a portion of the path and to a sensor, in which said synchronizing means positions said other portion during absence of the transmission from the source and said reflective portion during the reflection.

8. A beam splitter according to claim 7 in which said source comprises a high-energy laser, the electromagnetic radiation comprises high-energy laser radiation, and the intermittent transmission results from pulsed firing of said laser.

9. A beam splitter for alternately permitting passage of an intermittent beam of electromagnetic energy along a first path and diverting a co-linear, retrodirected beam of electromagnetic energy into a second path comprising:

a cylinder rotatable about an axis of rotation parallel to a generatrix and having an external surface which is generally reflective and which has at least one discontinuity or asymmetry about its periphery, the axis of rotation being generally perpendicular to the first and second beam paths and positioned with respect to the first beam path such that, during rotation, the reflective portion of said cylinder intercepts the first beam path and the discontinuous or asymmetric portion of the cylinder does not intercept the beam path; and means for rotating said cylinder about its axis for enabling respective passage of an intermittent beam along the first path and reflection of a co-linear, retrodirected beam along the second path.

10. A beam splitter for redirecting a beam of electromagnetic energy from its path comprising:

a cylinder having an axis of rotation and a discontinuous reflective surface positioned about the axis and generally in the path, said surface comprising at least one reflective portion positionable in the path, and at least another portion positionable outside of the path, and comprising at least one slot passing through said cylinder and extending through said reflective portion; and means for rotating said cylinder about its axis for enabling respective reflection of the beam from said surface and bypassing of the beam past said surface through the slot.

11. A beam splitter for redirecting a beam of intermittently transmitted electromagnetic energy from its path comprising:

a cylinder having an axis of rotation and a discontinuous reflective surface positioned about the axis and generally in the path, said surface comprising at least one reflective portion positionable in the path and at least another portion positionable outside of the path;

means for rotating said cylinder about its axis for enabling respective reflection of the beam from said surface and bypassing of the beam past said surface;

means for synchronizing the intermittent transmission of the beam with said cylinder moving means; and optical elements for directing the beam from its source along its path and to a target for reflection and/or re-radiation therefrom and for directing the return energy back along at least a portion of the path and to a sensor, in which said synchronizing means positions said other portion during absence of the transmission from the source and said reflective portion during the reflection.

* * * * *